United States Patent [19]

Nicol

[11] Patent Number: 4,712,845

[45] Date of Patent: Dec. 15, 1987

[54] SELF-OPENING RECEPTACLE ASSEMBLY WITH ADJUSTABLE ROLLERS

[75] Inventor: Steven M. Nicol, Canton, Mich.

[73] Assignee: NI Industries, Inc., Novi, Mich.

[21] Appl. No.: 823,033

[22] Filed: Jan. 27, 1986

[51] Int. Cl.⁴ .................................................. A47B 88/16
[52] U.S. Cl. ...................................... 312/319; 206/567;
224/281; 296/37.9; 312/328; 312/333
[58] Field of Search ....................... 296/37.9, 37.12;
312/242, 246, 330 R, 348, 333, 319, 326, 327,
328; 224/280, 281, 282; 206/567

[56] References Cited

U.S. PATENT DOCUMENTS

| | | | |
|---|---|---|---|
| 962,122 | 6/1910 | Brown | 312/246 |
| 2,462,397 | 2/1949 | Hendricks | 312/246 |
| 3,453,034 | 7/1969 | De Boer | 296/37.9 X |
| 3,460,876 | 8/1969 | De Boer | 312/246 |
| 3,460,877 | 8/1969 | De Boer | 312/246 |
| 4,462,630 | 7/1984 | Omata | 296/37.9 |
| 4,494,806 | 1/1985 | Williams et al. | 224/281 X |
| 4,596,427 | 6/1986 | Pflugfelder | 312/319 |

Primary Examiner—Stephen Marcus
Assistant Examiner—Bryon Gehman
Attorney, Agent, or Firm—Harness, Dickey & Pierce

[57] ABSTRACT

There is disclosed an improved closable receptacle assembly particularly designed for use in a motor vehicle which assembly includes a housing and a container assembly movably supported within the housing. The container assembly includes a pair of side rails which are adapted to movably support the container assembly on a plurality of spaced roller members provided on the housing so as to enable the container assembly to move freely and easily into and out of the housing. Each of the roller members is adjustably secured to the sidewalls of the housing assembly so as to allow for precise, accurate adjustment thereof with respect to the side rails provided on the container assembly. Additionally, a suitable spring is provided which operates to bias the container assembly into an open position and a latch arrangement is provided to maintain the container assembly in a closed position.

4 Claims, 9 Drawing Figures

4,712,845

SELF-OPENING RECEPTACLE ASSEMBLY WITH ADJUSTABLE ROLLERS

BACKGROUND AND SUMMARY OF THE INVENTION

The present invention is directed generally to closable receptacle assemblies and more specifically to such closable receptacle assemblies which are particularly designed for use in motor vehicles such as for example ash trays and the like.

Motor vehicles have long been provided with various closable receptacles such as for example ash trays and glove boxes. Typically, such closable receptacles have either employed a pivotable mounting therefor or alternately have employed a slide arrangement for moving a container assembly into and out of a closed position. More recently, self-actuating ash trays have been provided which employ biasing means to move the ash tray into an open position in combination with push-to-latch and push-to-release latch means for maintaining the ash tray in a closed position. It is particularly important with these self-actuating ash tray assemblies to insure that the ash tray is supported within the housing for relatively free and easy movement whereby the biasing means may operate with a relatively low amount of force to move the ash tray into the open position upon release of the latch assembly.

One form of self-actuating ash tray assembly presently in use employs a container assembly which moves about a single fixed pivot point. While this arrangement provides a suitable operating assembly, it requires a substantial amount of space in order to position the pivot point at a location that will allow sufficient opening movement of the ash tray assembly so as to afford a reasonable access thereto.

Another self-actuating ash tray assembly presently in use employs a horizontally slidable container assembly which travels along a supporting track arrangement. While this arrangement eliminates the excessive space requirements associated with the use of a single pivot point, it nevertheless positions the ash tray in a generally vertically upward opening direction thus creating the possibility that other portions of the vehicle such as the dash or the like may interfere or otherwise restrict access thereto.

The present invention, however, provides a closable receptable assembly which is designed for arcuate movement about a false pivot point so as to provide both the benefits offered by a pivotable mounting arrangement as well as the minimal space requirements of the sliding arrangement. Thus, the present invention employs a pair of rails provided on the container assembly which are designed to travel along adjustably mounted rollers provided on the housing portion thus enabling the ash tray to move into a fully open position wherein the opening of the ash tray is directed in a upward direction which is angled away from the mounting surface within which the assembly is installed. This not only affords the advantage of easier access thereto but also reduces the possibility that a user may inadvertently touch surrounding portions of the mounting surface with a burning cigarette. In order to assure accurate alignment of the container assembly within the housing so as to provide for the required free and easy movement, the roller assemblies secured to opposite sides of the housing are provided with adjustment means whereby they may be easily positioned so as to assure the door member associated with the receptacle assembly will move into a proper overlying relationship with respect to the opening provided in the housing.

Additional advantages and features of the present invention will become apparent from the subsequent description and the appended claims taken in conjunction with the accompanying drawings.

DESCRIPTION OF THE PREFERRED EMBODIMENT

Figure 1:
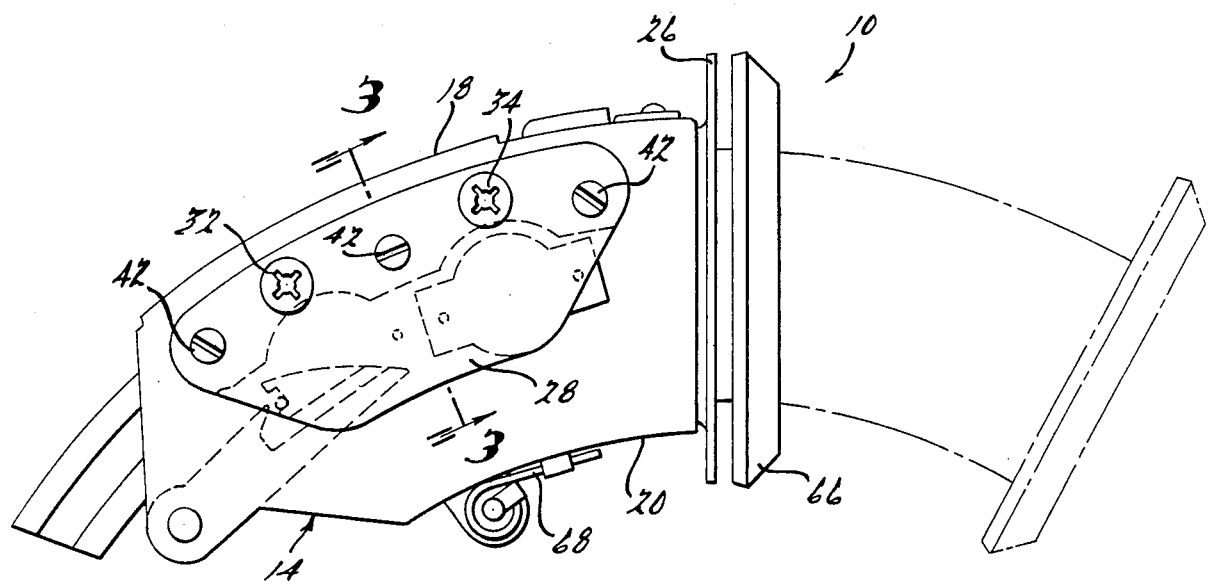
FIG. 1 is a side elevational view of the closable receptacle assembly of the present invention.

Referring now to the drawings and in paticular to FIG. 1, there is illustrated a self-actuating closable receptacle assembly in the form of an ash tray in accordance with the present invention and indicated generally at 10. Ash tray assembly 10 comprises a container assembly 12 movably supported within an outer housing 14 by means of cooperating rail and roller means 16.

Figure 3:
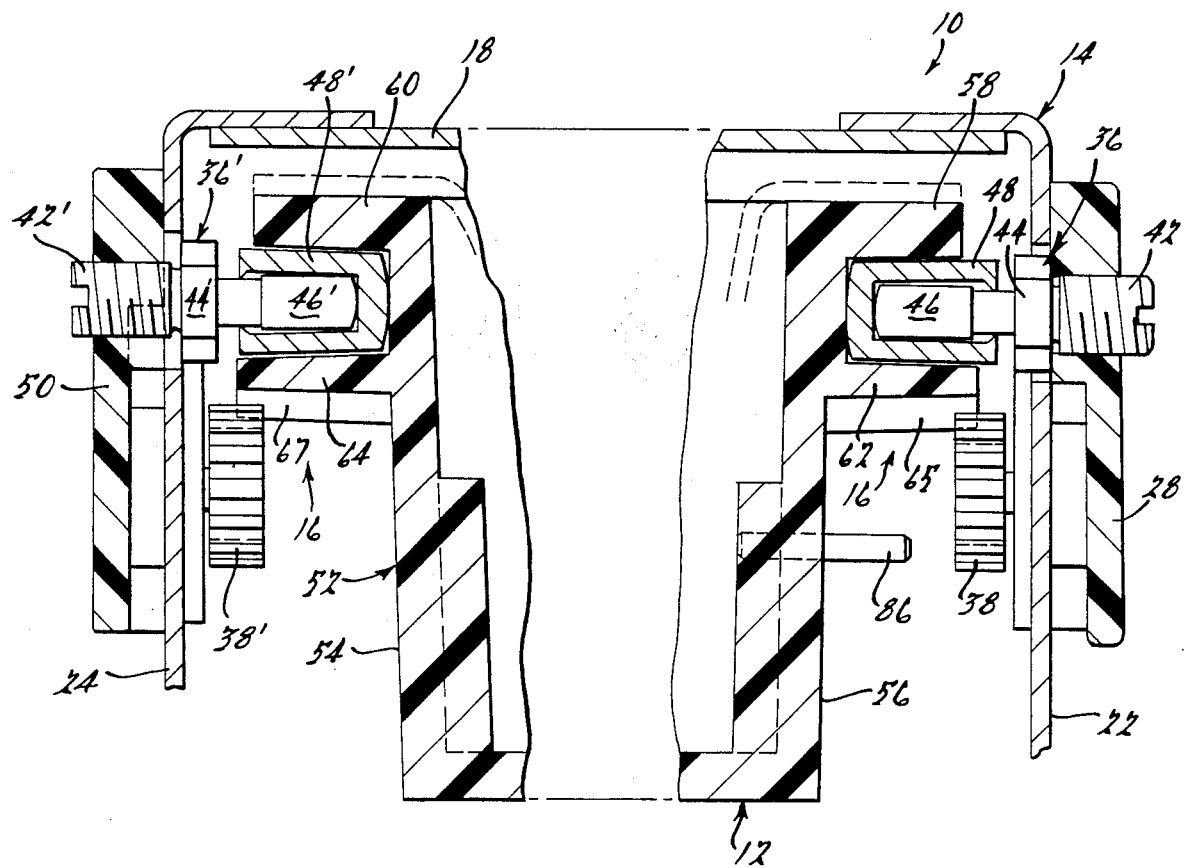
FIG. 3 is a section view of the closable receptacle assembly of FIG. 1, the section being taken along line 3—3 thereof.
Figure 2:
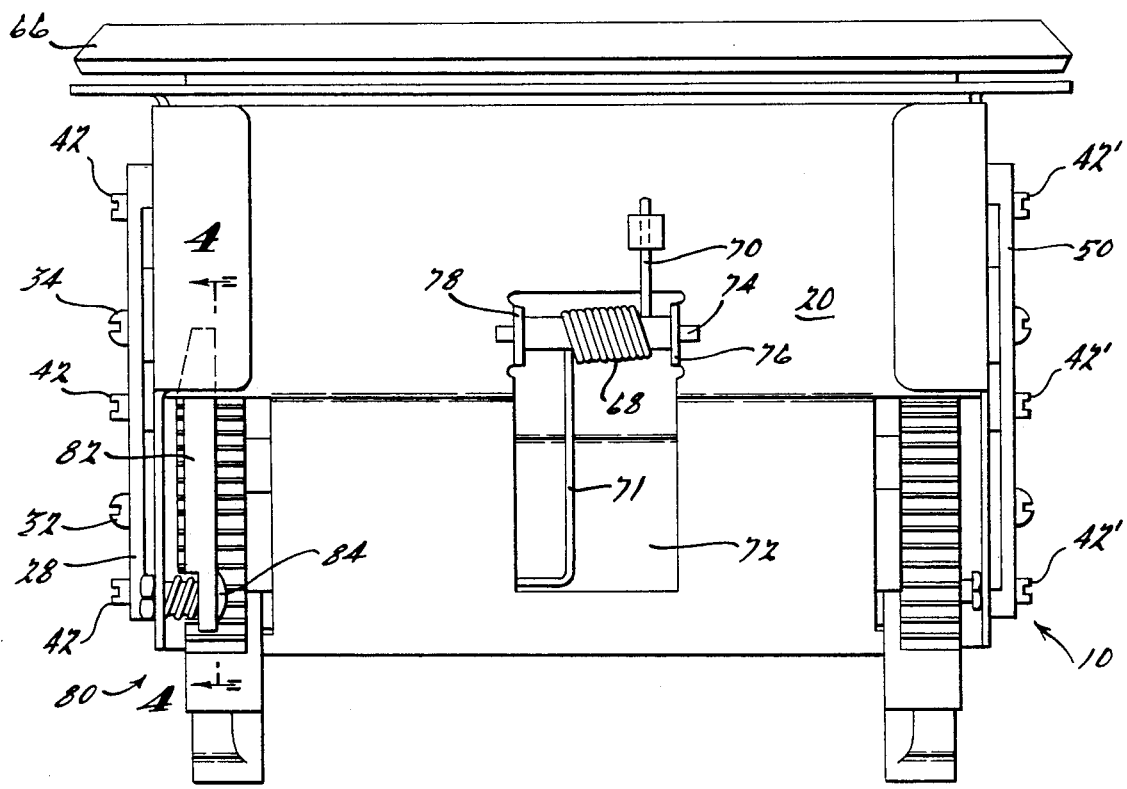
FIG. 2 is a bottom view of the closable receptacle assembly of FIG. 1.

As best seen with reference to FIGS. 1 through 3, housing 14 comprises generally arcuately shaped upper and lower walls 18, 20 interconnected in generally spaced parallel relationship by means of a pair of laterally spaced generally parallel sidewalls 22, 24 so as to define a generally enclosed area therewithin. A peripherally extending flange member 26 is secured to the front edge of housing 14 and serves to facilitate mounting of the closable receptacle assembly 10 within a suitable opening provided in a motor vehicle.

An elongated plate member 28 is provided being secured to sidewall 22 of housing 14 by means of suitable fasteners 32 and 34 and operates to adjustably support a plurality of roller assemblies 36 spaced therealong and which project inwardly through suitable openings in sidewall 22 into the interior of housing 14. Additionally, plate member 28 operates to secure a gear damper 38 having a pair of generally radially outwardly projecting arm members against the sidewall with the gear portion thereof projecting inwardly through a suitably provided opening in sidewall 22.

As best seen with reference to FIG. 3, each of the roller assemblies 36 comprise a generally elongated pin member having helical threads 42 provided at one end thereof engaging suitable threads provided in plate member 28 and which terminate at an enlarged diameter abutment portion 44. A generally smooth cylindrically shaped shank portion 46 extends axially inwardly thereof into the interior of the housing 14. A generally cylindrically shaped roller member 48 preferably fabricated from a suitable plastic material is loosely fitted onto the shank portion 46 and is designed to rotate freely with respect thereto. As shown, roller member 48 will have a slightly inward conical taper provided thereon. The outer end of roller assembly 36 is slotted so as to accept a conventional screw driver blade whereby suitable inward and outward adjustment thereof may be accomplished by rotating same.

Sidewall 24 is also provided with a similar plate member 50 which operates to support a second gear damper 38' as well as a corresponding number of roller assemblies 36'. As each of the gear damper 38' and roller assemblies 36' are virtually identical to those described above, corresponding portions have been indicated by like reference numbers primed.

A container assembly 12 is also provided which is movable into and out of the housing and includes a generally box-shaped article receiving portion 52 defined in part by laterally spaced sidewalls 54, 56. As best seen with reference to FIG. 3, each of the laterally spaced sidewalls 54, 56 includes upper and lower generally laterally outwardly extending flange portions 58, 60, 62, 64 of substantial length greater than that of sidewalls 54, 56 and extending along the upper portion thereof in a generally arcuate parallel manner so as to define respective channels therebetween. As shown in the drawings, this channel will include upper and lower sidewalls which are slightly inwardly tapered and designed to cooperate with the roller members 48 provided on each of the respective roller assemblies 36 and 36' so as to suitably movably support and guide movement of the container assembly 12 into and out of the housing 14. Each of the lower flange members 62, 64 also includes a toothed rack portion 65, 67 extending over a portion of the length thereof which is positioned so as to meshingly engage and rotatably drive the gear members provided on gear dampers 38, 38'.

Container assembly 12 also includes a forwardly positioned closure member or door 66 which is fitted to and designed to overlie the forwardly facing opening provided in the housing 14. This closure member 66 may be provided on its outwardly facing surface with any suitable covering material so as to present an aesthetically pleasing appearance such as for example a material corresponding to the surrounding material of the structure into which the ash tray is to be fitted. Preferably the closure member 66 will be of a size so as to substantially fully cover the flange member 26 so as to thereby create an appealing appearance when in a closed position.

In order to bias the container assembly into an open position, a suitable spring member 68 is provided mounted on the bottom wall portion 20 of the housing 14. As best seen with reference to FIG. 2, spring member 68 includes a first leg portion 70 bearing against bottom wall portion 20 of the housing 14 and a second leg portion 71 slidably bearing against a rear wall portion 72 of the container assembly 12. A suitable pin member 74 extending between a pair of outwardly turned flange members 76, 78 operates to support the coil portion of the spring on the housing 14.

In order to maintain the container assembly in a closed position opposing the force of spring member 68, a latch assembly 80 is also provided which comprises a latch lever arm 82 pivotably supported on a portion of the housing 14 by means of a suitable pin member 84. Latch assembly 80 also includes a coacting pin member 86 mounted on a forward edge portion of the sidewall 54 forming a part of the container assembly 12.

Figure 4:
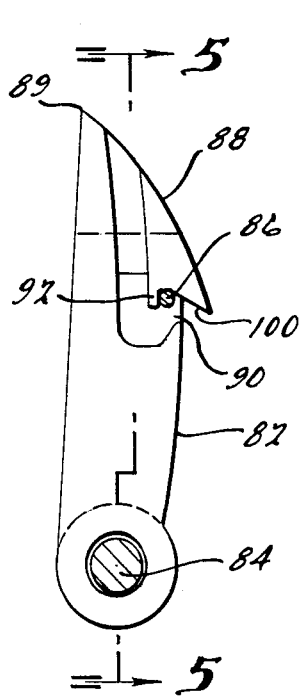
FIG. 4 is a fragmentary section view of the closable receptacle assembly of FIG. 2, the section being taken along line 4—4 thereof.
Figure 5:
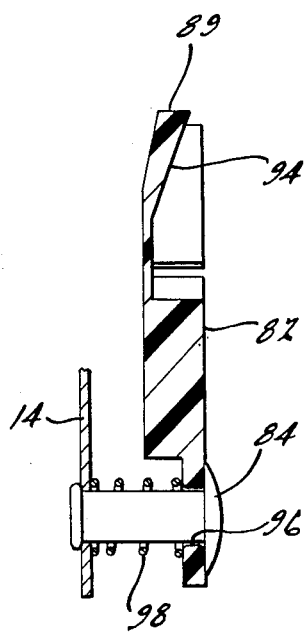
FIG. 5 is a fragmentary section view of the latch lever shown in FIG. 4, the section being taken along line 5—5 thereof.
Figure 6:
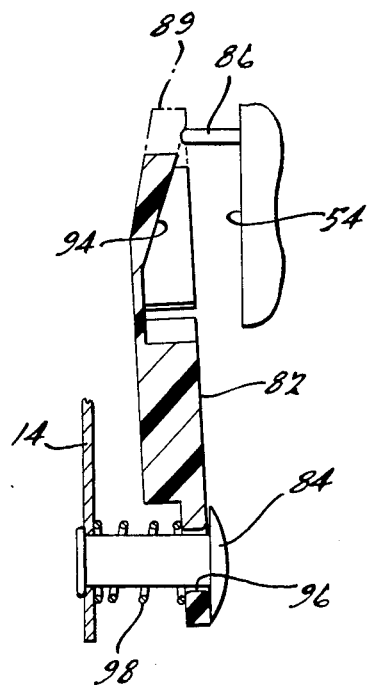
FIG. 6 is a view similar to that of FIG. 5 but illustrating the latch lever in relative position to a follower pin provided on the container assembly during its outward movement therefrom.

As best seen with reference to FIGS. 4, 5, and 6, latch lever arm 82 includes a first outer cam surface 88 of a generally arcuate shape extending from a forwardly projecting leading edge 89 upwardly and rearwardly toward the rear of the assembly. This cam surface 88 terminates in the rear portion wherein it overlies a groove 90 extending inwardly of the latch lever arm 82. As best seen with reference to FIG. 4, a ledge portion 92 extends inwardly with respect to the groove 90 just below the entry thereof and provides a stop surface to limit further inward movement of the pin member 86 provided on the container assembly 12. From this point, the groove 90 continues inwardly or to the left as illustrated in FIG. 4 around the ledge portion and then extends generally longitudinally of the lever arm 82 toward the forwardly projecting end portion 89 thereof. As best seen with reference to FIGS. 5 and 6, this forwardly projecting extension includes a beveled portion 94 extending generally to the right as shown in FIGS. 5 and 6 which results in a gradual and continuous reduction in depth of the groove 90 in the direction toward end portion 89. As also shown in these figures, the opening 96 through which the retaining pin 84 projects is somewhat larger in diameter than the diameter of the pin 84 extending therethrough so as to allow for lateral movement of the latch lever arm 82 with respect thereto in addition to the pivotable movement. A spring member 98 is also provided which surrounds the latch lever retaining pin member 84 and operates to bias the latch lever arm 82 against a head portion of pin member 84 and into a generally perpendicular relationship with respect to the longitudinal axis of pin 84 as well as to bias the latch lever arm 82 in a generally upward direction with respect to the housing member 14. A suitable stop surface (not shown) in the form of an inwardly projecting tab struck from and extending inward from sidewall 22 is also provided integrally formed with the housing 14 so as to limit this upward pivotable movement of the latch lever arm 82.

Figure 7:
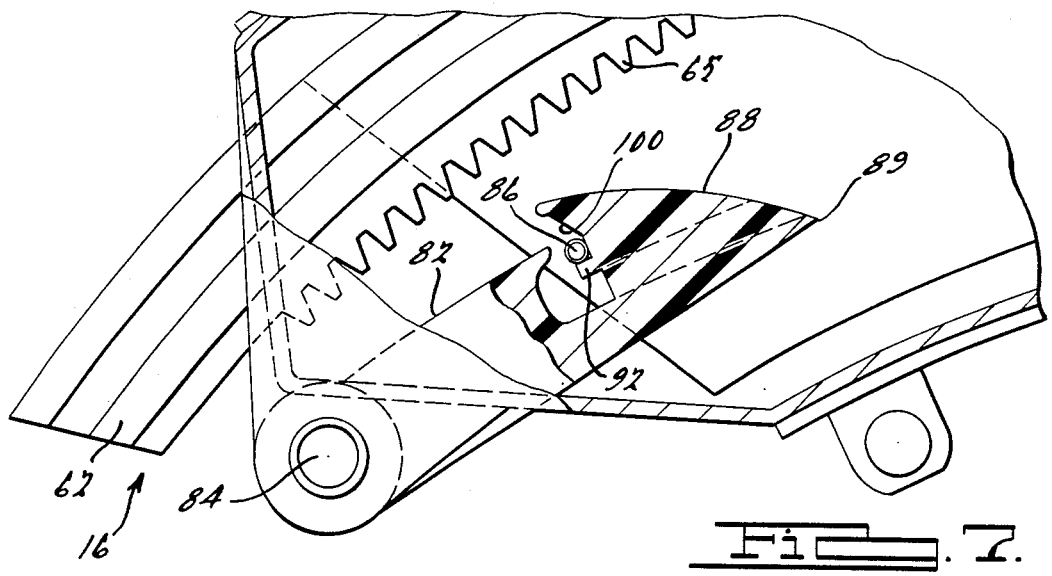
FIGS. 7, 8 and 9 are similar fragmentary section views with portions thereof broken away illustrating the cooperative action between the latch lever and follower pin provided on the container assembly.
Figure 8:
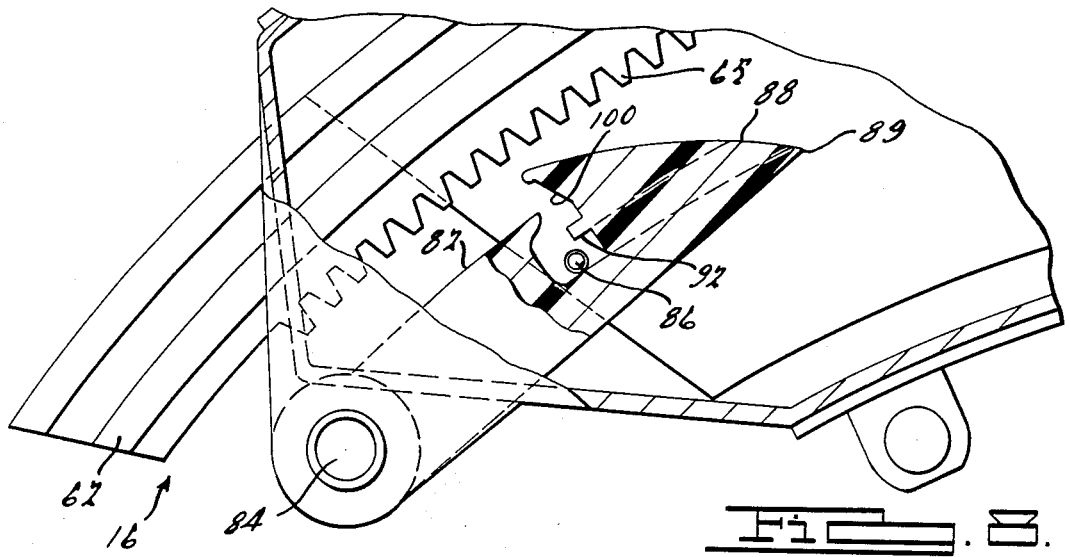

As previously mentioned, the latch mechanism incorporated in the present invention is of the push-to-latch, push-to-release type and latch lever 82 will operate to maintain the container assembly 12 in a closed position by the engagement of pin member 86 with the ledge portion 92 of the groove 90 provided in latch lever arm 82 as is illustrated in FIGS. 4 and 7. In order to release or open the ash tray of the present invention, an individual need merely push lightly on the closure member 66 moving the container assembly 12 inwardly with respect to the housing 14 slightly whereupon the pin member 86 will move rearwardly with respect to the latch lever 82 and off the ledge portion 92 provided within the groove 90 thereby allowing the latch lever spring 98 to bias the latch lever arm 82 upwardly with respect to the pin member 86 whereby pin member 86 will move into the lower portion of the groove 90 as best seen with reference to FIG. 8. At this point, it will be seen from FIG. 8 that the pin member 86 has free access to move outwardly longitudinally with respect to the latch lever 82 along the outwardly opening portion of the groove 90. Thus, the leg 71 of the spring biasing member 68 acting against the rear wall portion 72 of the container assembly 12 will operate to move the container assembly 12 and associated pin member 86 in an outward direction with respect to the housing. As best seen with reference to FIG. 6, pin member 86 will cause the latch lever 82 to move laterally sideways about the loosely fitted connection with the retaining pin member 84 so as to exit out the groove 90 as the container assembly 12 moves outwardly of the housing 14. Additionally, it should be noted that the gear damper means 38 and 38' provided on the opposite sides of the housing 14 will operate to dampen or slow down the outward movement of the container assembly 12 so as to create a smooth opening movement thereof. Suitable stop means may be provided projecting inwardly from the upper wall 18 of the housing and operate to engage the inner surface of the rear wall portion 72 of the container assembly 12 so as to limit the outward movement thereof.

Figure 9:
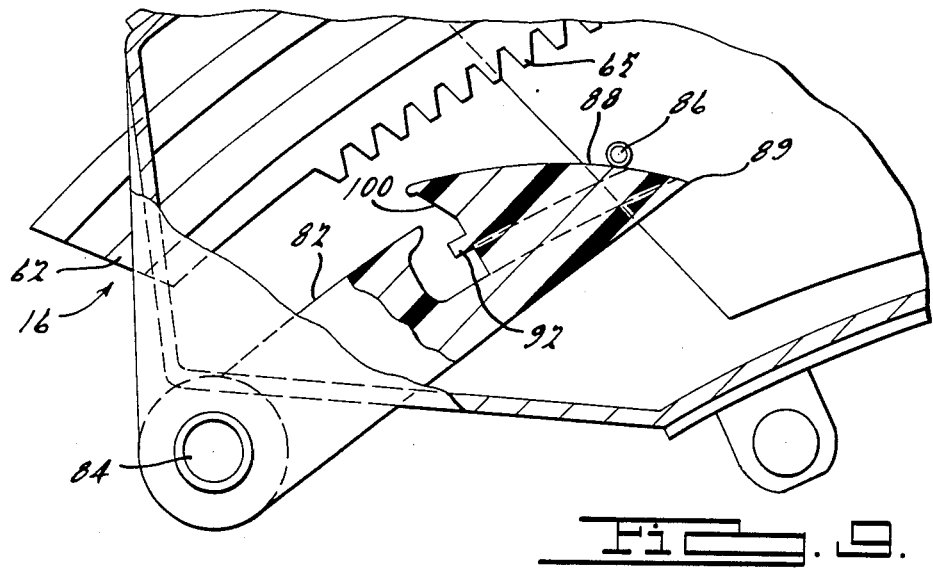

In order to close the container assembly 12, it is merely necessary for an individual to push the container assembly 12 inwardly with respect to the housing 14. As the pin member 86 moves inwardly with respect to the housing 14 it will engage the leading edge of latch lever 82 and will ride upwardly along the arcuate cam surface 88 provided thereon such as is shown in FIG. 9. It should be noted that because the outwardly extending groove 90 tapers to the right as illustrated in FIGS. 5 and 6 and the latch lever spring member 98 operates to bias the latch lever 82 into a generally perpendicular relationship with respect to the retaining pin 84, the pin member 86 provided on the container assembly 12 will not move into the groove portion 90 but rather will be directed along the exterior arcuately shaped cam surface 88 provided on the latch lever 82. Once the container assembly has been moved sufficiently inward, the pin member will move over the trailing edge portion of the cam surface 88. It should be noted that the trailing edge portion of this cam surface 88 is positioned with respect to the opening into the groove 90 so as to insure the pin member 86 will move into the groove 90 and engage the stop surface provided by ledge 92 at such time as the closing pressure exerted on the container assembly 12 is released. Once this closing pressure has been released the container assembly 12 will be again biased outwardly slightly causing the pin member 86 to move into engagement with the inclined cam surface 100 provided immediately adjacent the opening to groove 90 which will then operate in cooperation with spring 98 to bias the latch lever arm 82 upwardly with respect to pin 86 so as to cause it to move into and against the outwardly projecting ledge portion 92 which will then operate to retain the pin member 86 in this position and to maintain the container assembly 12 in a closed position.

It should be noted that because of the adjustment arrangement which enables the roller members 36, 36' to be accurately positioned with respect to the tracks, it is possible to precisely align and center the door member 66 provided on the container assembly 12 in accurately aligned overlying relationship to the opening provided in the housing 14. Additionally, this adjustment arrangement allows each of the roller members 36, 36' to be individually positioned so as to assure a free and easy movement of the container assembly 12 both into and out of the housing. This free and easy movement is important as it enables a relatively low force spring biasing means 68 to be used for effecting the opening movement of the container assembly and thus reduces the amount of force which an individual must exert in order to move the container assembly 12 into a closed position. Further, because of the provision of inclined surfaces on the rail members cooperating with the tapered roller members 48 as well as the provision of a plurality of such roller members on each side of the housing, it is possible to effect very easy low force closing movement of the container assembly without regard to whether an individual applies a closing force on either side or centrally of the door member 66.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. A self-opening receptacle assembly comprising:
    a housing adapted to be supportingly secured in a motor vehicle and having an opening at one end thereof;
    a container assembly movably supported for movement inwardly and outwardly with respect to said housing through said opening, said container assembly including a closure member positionable in overlying relationship to said opening when said container assembly is in a closed position;
    means defining a pair of elongated arcuately shaped guide channels provided on opposite lateral sides of one of said housing and said container assembly and projecting into the space between said container assembly and said housing, said channels including first and second spaced substantially parallel surfaces and an inner end wall extending between said first and second surfaces;
    a plurality of axially adjustable elongated rollers positioned in an arcuate spaced relationship on each of the opposite lateral sides of the other of said housing and said container assembly;
    said rollers being received within said arcuate guide channels and cooperating therewith to provide the sole support for and to guide inward and outward arcuate movement of said container assembly with respect to said housing, each of said rollers being axially adjustable to enable accurate alignment of said closure member with respect to said housing and to assure free and easy movement of said container assembly inwardly and outwardly of said housing and including a generally cylindrical surface engageable with one of said first and second surfaces and an end surface engageable with said end wall at a substantially point contact;
    biasing means operative to urge arcuate movement of said container assembly outwardly with respect to said housing; and
    releasable latch means for retaining said container assembly in said closed position.

2. A receptacle assembly as set forth in claim 1 wherein said plurality of rollers comprise three rollers spaced along each lateral side, said container assembly being supported by at least two of said rollers on each lateral side when in a fully open position and by all three of said rollers when in said closed position.

3. A receptacle assembly as set forth in claim 2 wherein each of said rollers comprise a pin member threadedly adjustably received within said sides of said other of said housing and said container assembly, each of said pins having a spherical free end surface and a cylindrical sleeve loosely fitted over said end and engageable with said end surface at a substantially point contact.

4. A self-opening receptacle assembly comprising:
   a housing adapted to be supportingly secured in a motor vehicle and having an opening at one end thereof;
   a container assembly movably supported for movement inwardly and outwardly with respect to said housing through said opening, said container assembly including a closure member positionable in overlying relationship to said opening when said container assembly is in a closed position;
   means defining a pair of elongated arcuately shaped guide channels provided on opposite lateral sides of one of said housing and said container assembly and projecting into the space between said container assembly and said housing, said channels including first and second spaced substantially parallel surfaces and an inner end wall extending between said first and second surfaces;
   a plurality of axially elongated rollers adjustably positioned in an arcuate spaced relationship on each of the opposite lateral sides of the other of said housing and said container assembly, each of said rollers comprising a threaded pin member adjustably received within said sides of said other of said housing and said container assembly, each of said pins having a spherical free end surface and a generally cylindrical sleeve loosely fitted over said end and engageable with said end surface at a substantially point contact, each of said sleeves including a cylindrical surface engageable with one of said first and second surfaces and an end surface engageable with said end wall at a substantially point contact.

* * * * *